US012659628B2

(12) United States Patent
Cowley et al.

(10) Patent No.: US 12,659,628 B2
(45) Date of Patent: Jun. 16, 2026

(54) IMAGE SENSOR WITH ASYNCHRONOUS SAMPLING FOR IMPROVED FRAME RATE

(71) Applicant: SEMICONDUCTOR COMPONENTS INDUSTRIES, LLC, Scottsdale, AZ (US)

(72) Inventors: Nicholas Paul Cowley, Wroughton (GB); Mukesh Rao Engla Syam, Bangalore (IN); Jeffery Beck, Philomath, OR (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 234 days.

(21) Appl. No.: 18/400,226

(22) Filed: Dec. 29, 2023

(65) Prior Publication Data

US 2025/0220324 A1     Jul. 3, 2025

(51) Int. Cl.
H04N 25/78 (2023.01)
H04N 25/441 (2023.01)
H04N 25/76 (2023.01)

(52) U.S. Cl.
CPC ........... H04N 25/78 (2023.01); H04N 25/441 (2023.01); H04N 25/7795 (2023.01)

(58) Field of Classification Search
CPC ... H04N 25/441; H04N 25/7795; H04N 25/78
See application file for complete search history.

(56) References Cited

U.S. PATENT DOCUMENTS

| | | | |
|---|---|---|---|
| 6,813,723 B1 | 11/2004 | Min | |
| 6,947,022 B2 | 9/2005 | McCartney | |
| 7,154,548 B2 * | 12/2006 | Liu | H10F 39/18 |
| | | | 348/E5.091 |
| 7,368,696 B2 * | 5/2008 | Shaw | H04N 25/633 |
| | | | 250/214 R |
| 8,659,694 B2 | 2/2014 | Compton et al. | |
| 2009/0079483 A1 | 3/2009 | Keskin et al. | |
| 2015/0281603 A1 * | 10/2015 | Kim | H04N 25/616 |
| | | | 348/308 |
| 2018/0261640 A1 * | 9/2018 | Hwangbo | H04N 25/633 |

OTHER PUBLICATIONS

Xiaochuan Guo, "A Time-Based Asynchronous Readout CMOS Image Sensor," Abstract of Dissertation Presented to the Graduate School of the University of Florida in Partial Fulfillment of the Requirements for the Degree of Doctor of Philosophy, Dec. 2002, 126 pgs.

* cited by examiner

*Primary Examiner* — Lin Ye
*Assistant Examiner* — Chriss S Yoder, III
(74) *Attorney, Agent, or Firm* — Slayden Grubert Beard PLLC

(57) ABSTRACT

A method of operating an image sensor having a pixel array is provided. The method can include outputting a row control signal to a row of pixels in the pixel array at a first time, sampling a first output signal from a first pixel in the row of pixels at a second time, and sampling a second output signal from a second pixel in the row of pixels at a third time after the second time. The row control signal can arrive at the first pixel in the row of pixels a first row propagation delay after the first time. The row control signal can arrive at the second pixel in the row of pixels a second row propagation delay after the first time. The difference between the second and third times may be equal to the difference between the first and second row propagation delays.

18 Claims, 7 Drawing Sheets

IMAGE SENSOR WITH ASYNCHRONOUS SAMPLING FOR IMPROVED FRAME RATE

FIELD

This relates generally to imaging systems and, more specifically, to image sensors with large pixel arrays.

BACKGROUND

An image sensor can include a large pixel array with thousands of rows and thousands of columns. The image sensor can include row control circuitry for providing row control signals to different rows of pixels in the array via corresponding row control lines.

It can be challenging to design an image sensor with large pixel arrays. When the pixel array is very large, the row control lines can exhibit large RC (resistance-capacitance) time constants across the array, which introduce substantial delays during readout or integration. These time delays can limit the performance of the image sensor. It is within this context that the embodiments herein arise.

DETAILED DESCRIPTION

Embodiments of the present technology relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels, sometimes referred to as image sensor pixels or imaging pixels. The image sensor pixels include photosensitive elements such as photodiodes that convert the incoming light into image signals. Image sensors may include hundreds, thousands, or millions of imaging pixels. Image sensors may include control circuitry such as driver circuitry for selectively accessing the pixels and readout circuitry for reading out image signals corresponding to the electric charge generated by the photosensitive elements.

Figure 1:
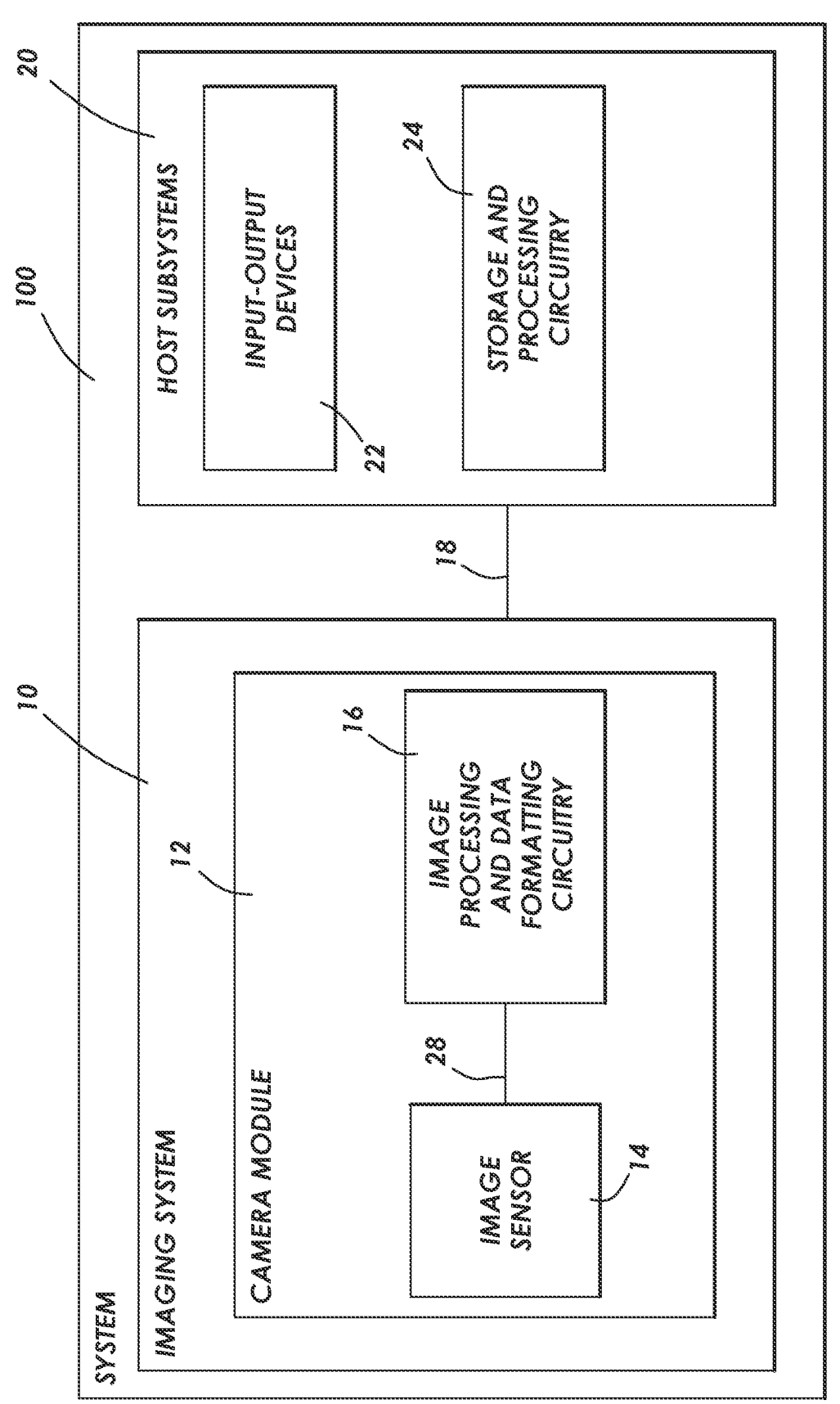
FIG. 1 is a diagram of an illustrative system having an image sensor in accordance with some embodiments.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system. As shown in FIG. 1, system 100 may include an imaging system such as imaging system 10 and host subsystems such as host subsystem 20. Imaging system 10 may include a camera such as camera module 12. Camera module 12 may include one or more image sensors 14, such as in an image sensor array integrated circuit, and one or more lenses. During image capture operations, each lens may focus light onto an associated image sensor 14. Image sensor 14 may include photosensitive elements such as image sensor pixels that convert incoming light into digital data. Image sensor 14 may include hundreds of pixels, thousands of pixels, millions of pixels, or any desired number of pixels.

Each image sensor in camera module 12 may be identical or there may be different types of image sensors in a given image sensor array integrated circuit. In some examples, image sensor 14 may further include bias circuitry, sample and hold circuitry, correlated double sampling (CDS) circuitry, amplifier circuitry, analog-to-digital converter circuitry, data output circuitry, memory, buffer circuitry, and/or addressing circuitry. Still and video image data from image sensor 14 may be provided to image processing and data formatting circuitry 16 via path 28. Image processing and data formatting circuitry 16 may be used to perform image processing functions such as data formatting, adjusting white balance and exposure, implementing video image stabilization, or face detection. Image processing and data formatting circuitry 16 may additionally or alternatively be used to compress raw camera image files if desired (e.g., to Joint Photographic Experts Group or JPEG format).

In one example arrangement, such as a system on chip (SoC) arrangement, sensor 14 and image processing and data formatting circuitry 16 are implemented on a common semiconductor substrate (e.g., a common silicon image sensor integrated circuit die). If desired, sensor 14 and image processing circuitry 16 may be formed on separate semiconductor substrates. For example, sensor 14 and image processing circuitry 16 may be formed on separate substrates that are stacked vertically with respect to each other.

Imaging system 10 may convey acquired image data to host subsystem 20 over path 18. Host subsystem 20 may include input-output devices 22 and storage and processing circuitry 24. Host subsystem 20 may include processing software for detecting objects in images, detecting motion of objects between image frames, determining distances to objects in images, or filtering or otherwise processing images provided by imaging system 10. For example, image processing and data formatting circuitry 16 of the imaging system 10 may communicate the acquired image data to storage and processing circuitry 24 of the host subsystems 20.

If desired, system 100 may provide a user with numerous high-level functions. In a computer or cellular telephone, for example, a user may be provided with the ability to run user applications. For these functions, input-output devices 22 of host subsystem 20 may include keypads, input-output ports, buttons, and displays and storage and processing circuitry 24. Storage and processing circuitry 24 of host subsystem 20 may include volatile and/or nonvolatile memory (e.g., random-access memory, flash memory, hard drives, solid-state drives, etc.). Storage and processing circuitry 24 may additionally or alternatively include microprocessors, microcontrollers, digital signal processors, and/or application specific integrated circuits.

Figure 2:
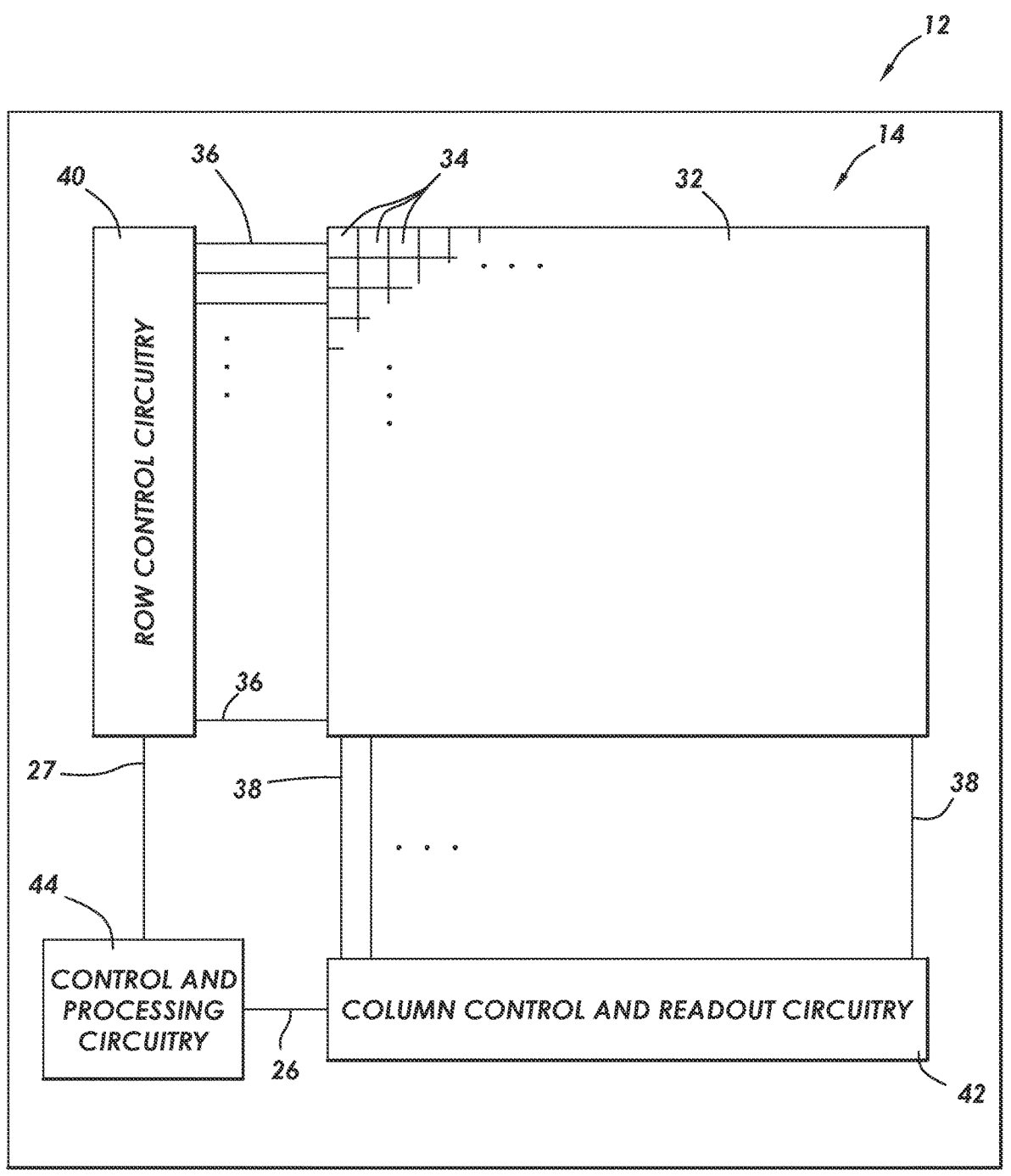
FIG. 2 is a diagram of an illustrative pixel array and associated row and column control circuitry in accordance with some embodiments.

An example of an arrangement of image sensor 14 of FIG. 1 is shown in FIG. 2. As shown in FIG. 2, image sensor 14 may include control and processing circuitry 44. Control and processing circuitry 44, sometimes referred to as control and processing logic, may be part of image processing and data formatting circuitry 16 in FIG. 1 or may be separate from circuitry 16. Image sensor 14 may include a pixel array such as array 32 of pixels 34. Pixels 34 are sometimes referred to herein as image sensor pixels, imaging pixels, or image pixels. Control and processing circuitry 44 may be coupled to row control circuitry 40 via control path 27 and may be coupled to column control and readout circuitry 42 via data path 26.

Figure 3:
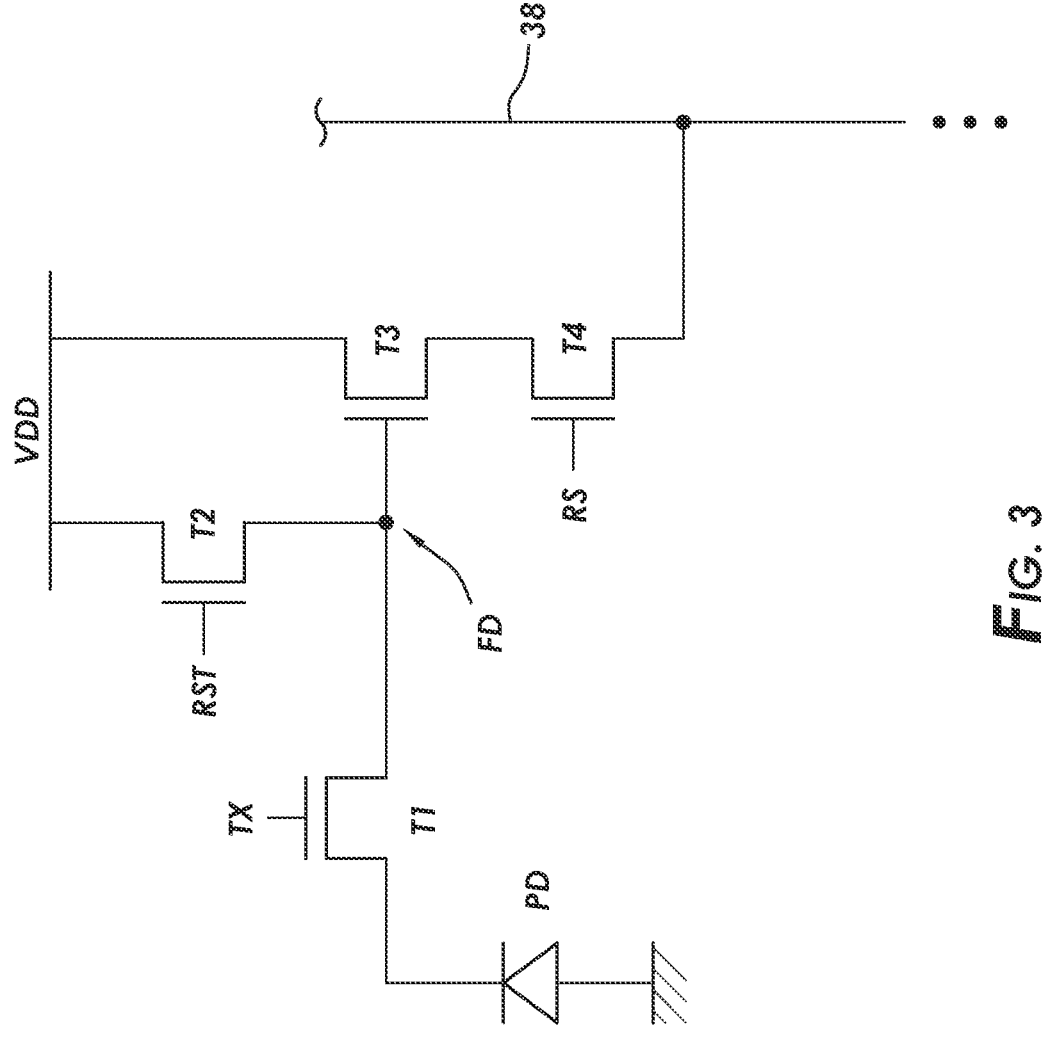
FIG. 3 is a circuit diagram of an illustrative image pixel in accordance with some embodiments.
Figure 3:

FIG. 3 is a circuit diagram of an illustrative image sensor pixel 34. As shown in FIG. 3, image sensor pixel 34 may include a photosensitive element such as a photodiode PD and a charge transfer transistor such as charge transfer transistor T1 having a first source-drain terminal coupled to photodiode PD, a second source-drain terminal coupled to floating diffusion node FD, and a gate terminal configured to receive charge transfer control signal TX. Photodiode PD has a p-type (anode) terminal coupled at a ground power supply line, sometimes referred to as a ground line or ground. Charge transfer transistor T1 is sometimes referred to as a charge transfer gate. Floating diffusion node FD is sometimes referred to as a floating diffusion region.

Pixel 34 may further include a reset transistor T2 having a drain terminal coupled to the positive power supply line on which VDD is provided, a source terminal coupled to floating diffusion node FD, and a gate terminal configured to receive a reset control signal RST. The terms "source" terminal and "drain" terminal when referring to current-conducting terminals of a metal-oxide-semiconducting (MOS) transistor can be used interchangeably and are sometimes referred to as "source-drain" terminals. For example, the drain terminal of reset transistor T2 can be referred to as its first source-drain terminal, and the source terminal of reset transistor T2 can be referred to as its second source-drain terminal, or vice versa.

Image pixel 34 may also include a source follower transistor T3 having a drain terminal coupled to the positive power supply line, a gate terminal coupled to floating diffusion node FD, and a source terminal. Source follower transistor T3 is sometimes simply referred to as a "source follower." Pixel 34 may further include a row select transistor T4 having a drain terminal coupled to the source terminal of source follower T3, a gate terminal configured to receive a row select control signal RS, and a source terminal coupled to a corresponding column line 38. Column line 38 may be coupled to more than 10 pixels in a column of pixels, 10-100 pixels in the column, hundreds of pixels in the column, or thousands of pixels in the column. Column line 38 is sometimes referred to as a pixel output line or a pixel output column line.

In the example of FIG. 3, transistors T1-T4 may all be n-type metal-oxide-semiconductor (NMOS) transistors. In other embodiments, at least some transistors T1-T4 can alternatively be implemented as p-type metal-oxide-semiconductor (PMOS) transistors. In yet other embodiments, imaging pixel 34 can optionally include four or more n-channel and/or p-channel transistors. The example of FIG. 3 in which pixel 34 includes four transistor T1-T4 is also merely illustrative. In other embodiments, imaging pixel 34 can include multiple photodiodes coupled to a shared floating diffusion node, fewer than four transistors, more than four transistors, five or more transistors, six or more transistors, one or more storage capacitors, one or more storage nodes, one or more mode switching transistors, multi-conversion gain components, bloom control components, and/or other pixel structures. The imaging pixel 34 can be rolling shutter type pixels or global shutter type pixels such as pixels that include additional storage nodes coupled between the photodiode and the floating diffusion region.

Referring back to FIG. 2, row control circuitry 40 may receive row addresses from control and processing circuitry 44 and may supply corresponding row control signals to image pixels 34 over one or more control paths 36. The row control signals may include pixel reset control signals, charge transfer control signals, blooming control signals, row select control signals, dual conversion gain control signals, and/or any other desired pixel control signals.

Column control and readout circuitry 42 may be coupled to one or more of the columns of pixel array 32 via one or more conductive lines such as column lines 38. A given column line 38 may be coupled to a column of image pixels 34 in image pixel array 32 and may be used for reading out image signals from image pixels 34 and for supplying bias signals (e.g., bias currents or bias voltages) to image pixels 34. In some examples, each column of pixels may be coupled to a corresponding column line 38. Column lines 38 are sometimes referred to as pixel output column lines.

For image pixel readout operations, a pixel row in image pixel array 32 may be selected using row driver circuitry 40 and image data associated with image pixels 34 of that pixel row may be read out by column readout circuitry 42 on column lines 38. Column readout circuitry 42 may include column circuitry such as column amplifiers for amplifying signals read out from array 32, sample and hold (S/H) circuitry for sampling and storing signals read out from array 32, analog-to-digital converter (ADC) circuits for converting readout analog signals into corresponding digital signals, and/or column memory for storing the readout signals and any other desired data. Column control and readout circuitry 42 may output digital pixel readout values to control and processing logic 44 over line 26.

Pixel array 32 may have any number of rows and columns. In general, the size of image pixel array 32 and the number of rows and columns in array 32 will depend on the particular implementation of image sensor 14. While "rows" and "columns" are generally described herein as being horizontal and vertical, respectively, the terms rows and columns may be used interchangeably and can refer to any grid-like structure. Features described herein as "rows" may be arranged vertically and features described herein as "columns" may be arranged horizontally. In other embodiments, pixel array 32 can be grouped into tiles or subregions that are equal in size or different in size. As an example, the pixel array can be divided into four regions of equal sizing and area. In general, the pixel array can be divided into more than four subregions, four to ten subregions, 10-20 subregions, 20-50 subregions, or 50-100 subregions that are independently controlled, addressed, and read out.

Pixel array 32 may be provided with a color filter array having multiple color filter elements which allows a single image sensor to sample light of different colors. As an example, image sensor pixels such as the image pixels in array 32 may be provided with a color filter array which allows a single image sensor to sample red, green, and blue (RGB) light using corresponding red, green, and blue image sensor pixels. The red, green, and blue image sensor pixels may be arranged in a Bayer mosaic pattern as an example.

The Bayer mosaic pattern consists of a repeating unit cell of two-by-two image pixels, with two green image pixels diagonally opposite one another and adjacent to a red image pixel diagonally opposite to a blue image pixel. In another example, broadband image pixels having broadband color filter elements (e.g., clear color filter elements, yellow color filter elements, etc.) may be used instead of green pixels in a Bayer pattern. These examples are merely illustrative and, in general, color filter elements of any desired color and pattern may be formed over any desired number of image pixels 34.

An image sensor 14 can sometimes include very large pixel arrays. For example, a large pixel array can include thousands of columns and/or thousands of rows. As described above in connection with FIG. 2, row control circuitry 40 can be used to provide row control signals to corresponding rows of pixels in pixel array 32 via respective row control lines 36. The pixel array can be read out on a row-by-row basis. In scenarios where each row of pixels includes thousands or tens of thousands of pixels (columns), the row control lines 36 can exhibit large RC (resistance-capacitance) time constants that result in progressively larger propagation delays across the width (horizontal dimension) of the pixel array. Similarly, the output column lines 38 can also exhibit long settling times across the length (vertical dimension) of the pixel array. Pixel readout timing may be determined by ensuring that all columns settle within desired limits defined by minimizing artifacts as a result of residual error. For example, a 10% column settling error might result in a residual error that is −20 dB relative to the signal of interest in the worst case scenario. A desirable target may be to achieve column settling error to less than 1% (as an example). For large pixel arrays, the propagation delay across the row lines 36 can be a significant factor in determining the overall frame rate of the image sensor. Such limitation is compounded for more complex pixels with two or more reads on a row-by-row basis.

Figure 4:
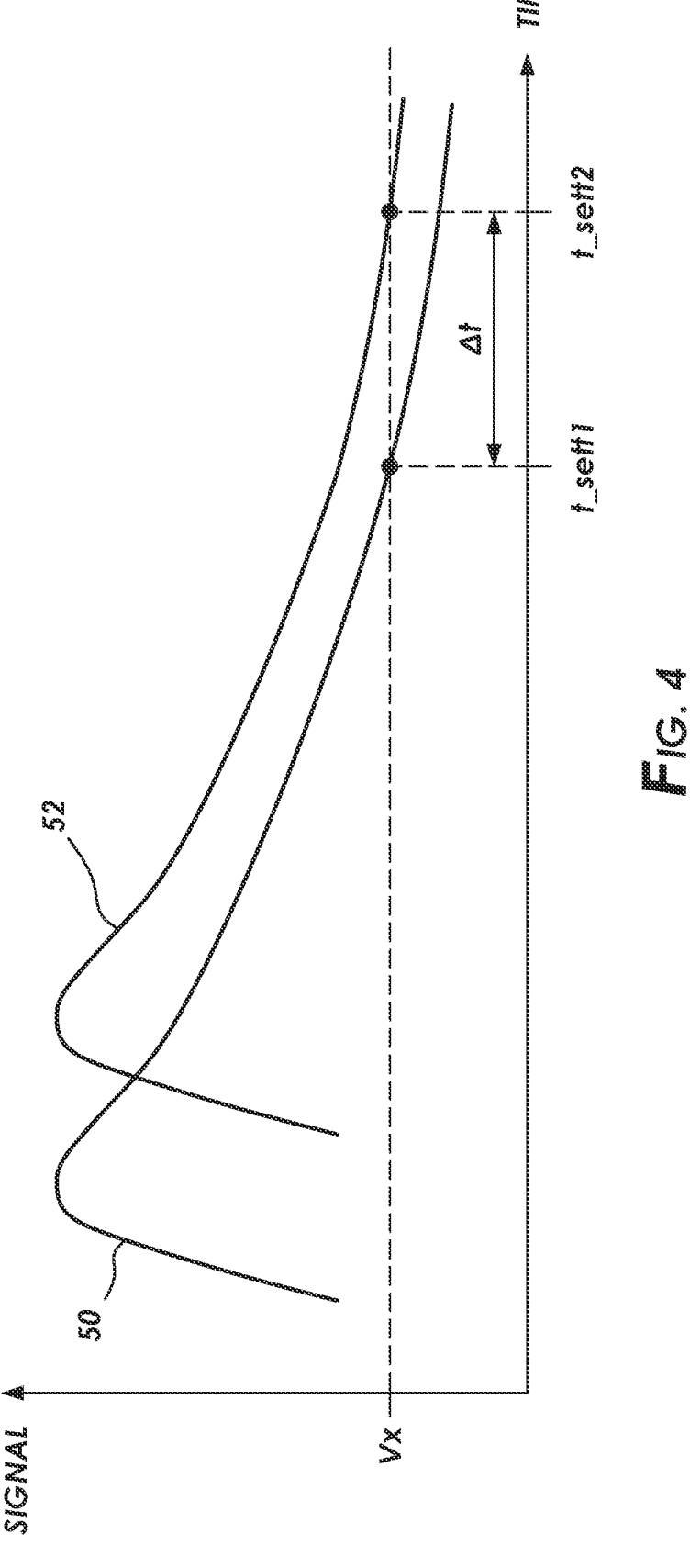
FIG. 4 is a timing diagram illustrating row timing can be reduced via pipelining and asynchronous sampling in accordance with some embodiments.

FIG. 4 is a timing diagram illustrating row timing can be reduced in accordance with some embodiments. Curve 50 may represent a pixel column output waveform in a column i, whereas curve 52 may represent a pixel column output waveform in a column j. Column i may represent a column that is closer to a peripheral row driver for driving the pixel in that column, whereas column j may represent another column that is further away from the peripheral row driver for driving the pixel in that column. Signal level Vx may represent a minimum signal level to which column output signals need to settle to meet design criteria. Conventional readout methods that employ synchronous sampling operations can exhibit reduced frame rate. In the example of FIG. 2, a synchronous sampling operation for columns i and j can occur at time t_sett2 at the earliest since waveform 52 in column j will not settle to level Vx until time t_sett2. This need to wait for signals from another column to settle will limit the ability to increase the overall frame rate in this kind of sampling scheme.

In accordance with an embodiment, image sensor 14 can be provided with a means for asynchronously sampling different column lines. The asynchronous column path sampling times can be correlated to the propagation delay across the row dimension such that the row propagation delays and the asynchronous sampling times will exhibit the same timing profile. Image sensor 14 can further include a means for outputting the asynchronous column samples to a synchronous digital data path. In the example of FIG. 4, waveform 50 can be sampled at a first (earlier) time t1, whereas waveform 52 can be asynchronously sampled at a second time t2. Sampling waveform 50 at an earlier time t1 can help reduce row time by Δt and can thus improve frame rate. Such asynchronous sampling of the column signals can be implemented by pipelining different row readout operations.

Figure 5:
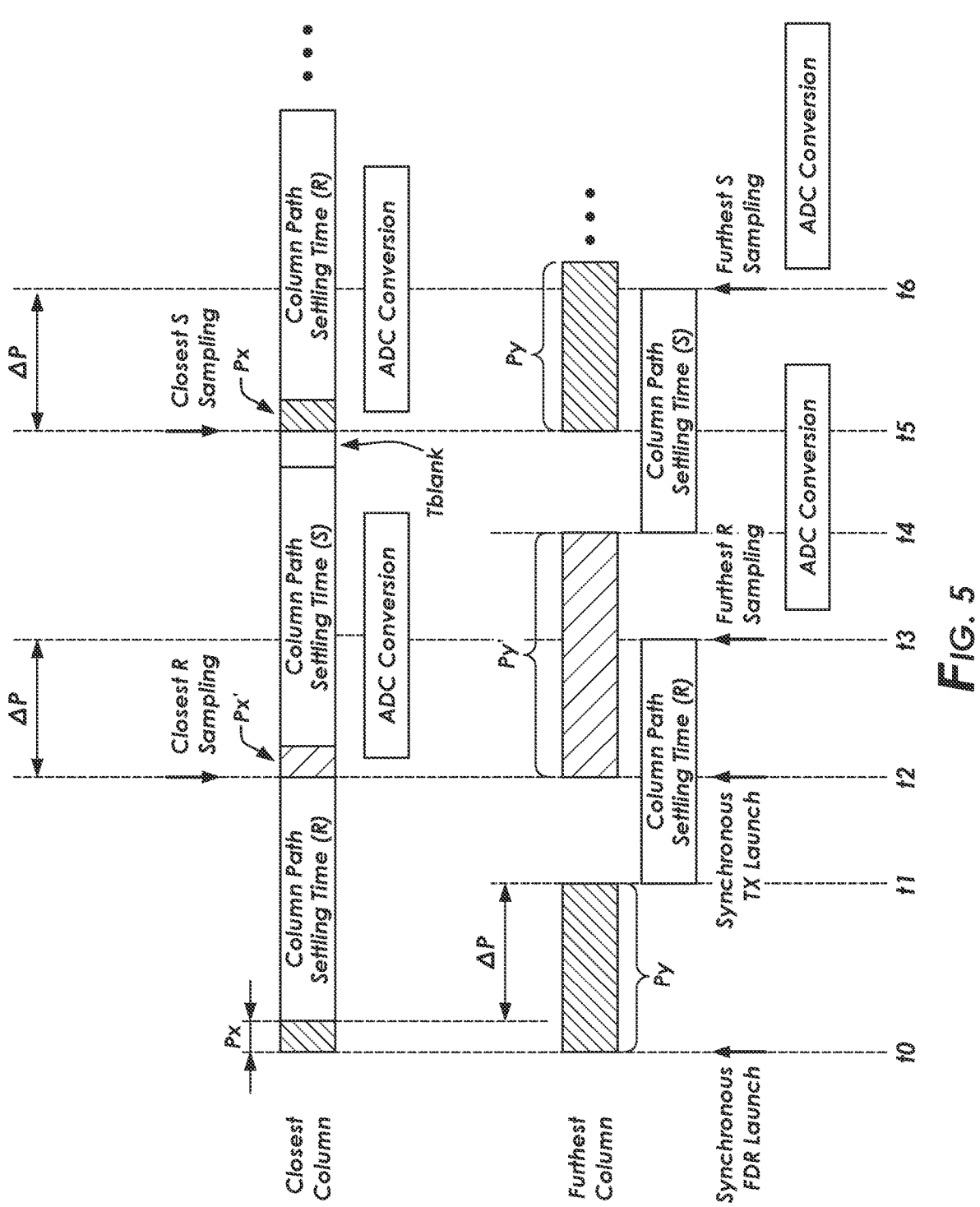
FIG. 5 is a timing diagram illustrating the operation of an image sensor array in accordance with some embodiments.
Figure 6:
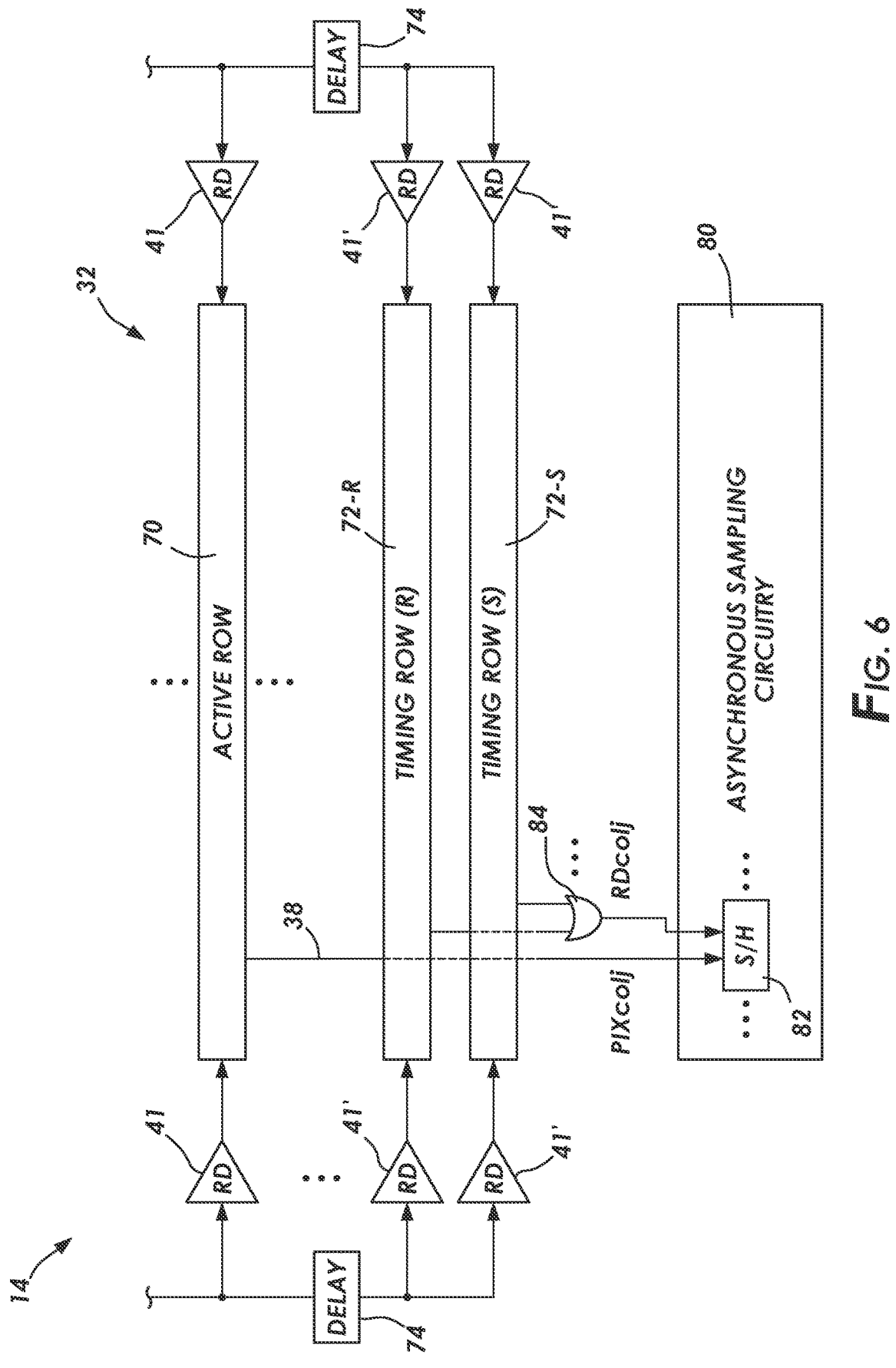
FIG. 6 is a schematic diagram of image sensor circuitry configured to perform the operations shown in FIG. 5 in accordance with some embodiments.

FIG. 5 is a timing diagram illustrating the operation of an image sensor array that exhibits improved row timing due to pipelining and asynchronous sampling in accordance with some embodiments. The "closest column" may refer to the column that is physically located closest to the row driver at the peripheral edge of the image pixel array. The "furthest column" may refer to the column that is physically located farthest away from the peripheral row driver. In an image sensor architecture that includes peripheral row drivers disposed along only one edge of the image pixel array as shown in the example of FIG. 2, the closest column would the first (leftmost) column and the furthest column would be the last (rightmost) column. In an image sensor architecture that includes peripheral row drivers disposed along two opposing edges of the image pixel array as shown in the example of FIG. 6, the closest column would be the leftmost column or the rightmost column, whereas the furthest column would be either of the middle (center) columns in the array.

FIG. 5 illustrates operations associated with reading signals out from one or more rows of image sensor pixels. A row of pixels that is currently being read out is sometimes referred to and defined herein as an "active row." At time to, a reset signal for resetting the floating diffusion node in each pixel along a given row of pixels can be synchronously launched. The terms "launch," "output," and "assert" can sometimes be used interchangeably herein to refer to a signal being driven from a previous (old or idle) value to a new value for reading or otherwise actively accessing a given row of pixels. Such reset signal is sometimes referred to as a floating diffusion reset (FDR) row control signal. The floating diffusion reset row control signal can be output by a row driver within row control circuitry 40 (see FIG. 2) and can propagate to successive columns in the active row via increasing row propagation delay times. As shown in FIG. 5, the FDR signal can propagate to the closest column after row propagation delay Px and can propagate to the furthest column after row propagation delay Py. The difference in row propagation delay times between the closest column and the furthest column is equal to propagation delay delta ΔP, where ΔP is equal to Py minus Px.

When the FDR signal arrives at the closest column some propagation delay Px after time to, the floating diffusion node is reset and a corresponding reset value can then be read out from the pixel in the closest column at time t2. The reset value is read out via a column line 38 coupled to the closest column. The reset value being read out may settle to an acceptable level after a column path settling time (R), where "R" stands for reset. The column path settling time (R) may be a function of the total number of pixels coupled to column line 38, the total capacitance of column line 38, and the length of column line 38 between the active row and the column control and readout circuitry 42 (see FIG. 2). After the reset value of the closest column has settled, the reset value of the closest column can be sampled at time t2. The sampled reset value of the closest column can then be converted from an analog voltage value to a corresponding digital code, as indicated by the "ADC conversion" step following time t2 in FIG. 5.

When the FDR signal arrives at the furthest column some propagation delay Py after time t0, the floating diffusion node is reset and a corresponding reset value can then be read out from the pixel in the furthest column at time t1. The reset value is read out via a column line 38 coupled to the furthest column. The reset value being read out may settle to an acceptable level after a column path settling time (R). The column path settling time (R) may be a function of the total number of pixels coupled to column line 38, the total capacitance of column line 38, and the length of column line 38 between the active row and the column control and readout circuitry 42 (see FIG. 2). After the reset value of the furthest column has settled, the reset value of the furthest column can be sampled at time t3. The sampled reset value of the furthest column can then be converted from an analog voltage value to a corresponding digital code, as indicated by the "ADC conversion" step following time t3 in FIG. 5.

Here, the time delay between the closest reset (R) sampling time and the furthest reset (R) sampling time may be equal to the propagation delay delta $\Delta P$ between the closest and furthest columns, as shown in FIG. 5. In general, the sampling times of the different columns can occur asynchronously at different times depending on the increasing row propagation delay associated with each successive column along a given row. In other words, the column path sampling time is adjusted based on the row signal propagation delay as it propagates across the given row. This allows row operations to be pipelined or overlapped (e.g., by allowing columns to be sampled at an earlier time than would otherwise be required based on a synchronous sampling scheme).

At time t2, a charge transfer (TX) signal for transferring accumulated charge from photodiode PD to the floating diffusion node FD in each pixel along the row of pixels can be synchronously launched. Such charge transfer signal is sometimes referred to as a charge transfer row control signal. The charge transfer row control signal can be output by a row driver within row control circuitry 40 (see FIG. 2) and can propagate to successive columns in the active row via increasing row propagation delay times. As shown in FIG. 5, the TX signal can propagate to the closest column after row propagation delay Px' and can propagate to the furthest column after row propagation delay Py'. The difference in row propagation delay times between the closest column and the furthest column may be equal to TX propagation delta $\Delta P'$ that is equal to Py' minus Px'.

Here, the charge transfer signal may be synchronously launched even before the reset value of the furthest column has completely settled. As shown in FIG. 5, the end of the propagation delay Px' and subsequent column path settling time(S) of the closest column occurs during the column path settling time (R) of the furthest column. In other words, the launch of the TX signal can be pipelined (overlapped) with the column path setting time of the furthest column due to the associated row propagation delay.

When the TX signal arrives at the closest column some propagation delay Px' after time t2, the floating diffusion node receives the accumulated charge and a corresponding signal(S) value can then be read out from the pixel in the closest column. The signal value is read out via column line 38 coupled to the closest column. The signal value being read out may settle to an acceptable level after a column path settling time(S), where "S" stands for image signal. The column path settling time(S) may be a function of the total number of pixels coupled to column line 38, the total capacitance of column line 38, and the length of column line 38 between the active row and the column control and readout circuitry 42 (see FIG. 2). After the signal value of the closest column has settled, the signal value of the closest column can be sampled at time t5. There may be a blank period of time, shown as Tblank in the example of FIG. 5, between the end of the column path settling time(S) and time t5. The sampled signal value of the closest column can then be converted from an analog voltage value to a corresponding digital code, as indicated by the "ADC conversion" step following time t5 in FIG. 5.

When the TX signal arrives at the furthest column some propagation delay Py' after time t2, the floating diffusion node receives the accumulated charge and a corresponding signal(S) value can then be read out from the pixel in the furthest column at time t4. The signal value is read out via column line 38 coupled to the furthest column. The signal value being read out may settle to an acceptable level after a column path settling time(S). The column path settling time(S) may be a function of the total number of pixels coupled to column line 38, the total capacitance of column line 38, and the length of column line 38 between the active row and the column control and readout circuitry 42 (see FIG. 2).

At time t5 before the signal value of the furthest column has completely settled, the FDR signal for a succeeding row of pixels in the closest column can be synchronously launched. In other words, the launch of the FDR signal can be pipelined (overlapped) with the column path setting time of the furthest column due to the associated row propagation delay.

After the signal value of the furthest column has settled, the signal value of the furthest column can be sampled at time t6. The sampled signal value of the furthest column can then be converted from an analog voltage value to a corresponding digital code, as indicated by the "ADC conversion" step following time t6 in FIG. 5.

Here, the time delay between the closest signal(S) sampling time and the furthest signal(S) sampling time may be equal or approximately equal to the propagation delay delta $\Delta P$ between the closest and furthest columns. In general, the sampling times of the different columns can occur asynchronously at different times depending on the increasing row propagation delay associated with each successive column along a given row. Operations for reading out alternating reset and signal values can continue in this way to support a correlated double sampling (CDS) readout scheme.

Performing pipelining and asynchronous sampling for different pixel columns as described above can be technically advantageous and beneficial to reduce or eliminate the duration of Tblank, which can optimize frame rate even for very large image sensor arrays. Such frame rate increase can be achieved without compromising on performance. This technique thus compensates for varying propagation delays in row drivers to increase the image sensor frame rate.

FIG. 6 is a schematic diagram of image sensor circuitry configured to perform the operations shown in FIG. 5. As shown in FIG. 6, image sensor 14 may include a pixel array 32 having a plurality of pixel rows, a first timing row 72-R configured to facilitate with the sampling of reset (R) values, a second timing row 72-S configured to facilitate with the sampling of signal(S) values, and a sampling block such as asynchronous sampling circuitry 80. Asynchronous sampling circuitry 80 can include a plurality of sample and hold (sampling) circuits 82. Each pixel rows can receive row control signals from corresponding row driver (RD) circuits 41. Each row driver circuit 41 in FIG. 6 can represent one or more row drivers configured to output one or more row control signals such as a floating diffusion reset (FDR) signal, a charge transfer (TX) signal, a row select signal, and/or other pixel control signals. The pixel array 32 can be read out on a row-by-row basis. The pixel row that is currently being read out or accessed can be referred to as the active (pixel) row 70.

In the example of FIG. 6, pixel array 32 can be driven using row driver circuits 41 disposed on opposing edges of array 32. In such configuration, the closest column to the row driver circuit 41 on the left edge of array 32 is the leftmost column (as shown in the top plan view of FIG. 6), whereas the furthest column to the row driver circuit 41 on the left edge of array 32 is the left column in the middle column pair of array 32. Similarly, the closest column to the row driver circuit 41 on the right edge of array 32 is the rightmost column, whereas the furthest column to the row driver circuit 41 on the right edge of array 32 is the right column in the middle column pair of array 32.

Timing row 72-R can be disposed along the edge of pixel array 32 that is physically closest to asynchronous sampling circuitry 80. In FIG. 6, this edge is the bottom edge. Timing row 72-R may be used for the sampling of reset values. Timing row 72-R can have identical structure as any of the pixel rows in pixel array 32 such that the propagation delay in the row direction matches that of the active row 70 currently being read out. Timing row 72-R is therefore sometimes referred to herein as a reference pixel row or a reference row of pixels. Timing row 72-R can also be driven using row driver circuits 41' disposed on opposing edges of pixel array 32. Row control signals output from row driver circuit 41' feeding timing row 72-R may be delayed with respect to the row control signals output from row driver circuit 41 feeding active row 70 by a delay amount provided by a first delay circuit 74 disposed somewhere along the left edge of pixel array 32 in the orientation of FIG. 6. The amount of delay provided by first delay circuit 74 may be equal to the column path settling time for a signal to settle on a column path 38.

Timing row 72-S can be disposed along the edge of pixel array 32 that is physically closest to asynchronous sampling circuitry 80. Timing row 72-S may be used for the sampling of signal values. Timing row 72-S can be formed adjacent to timing row 72-R. Timing row 72-S can have identical structure as any of the pixel rows in pixel array 32 such that the propagation delay in the row direction matches that of the active row 70 currently being read out. Timing rows 72-S and 72-R can thus also have identical structure. Timing row 72-S is therefore sometimes also referred to herein as a reference pixel row or a reference row of pixels. Timing row 72-S can also be driven using row driver circuits 41' disposed on opposing edges of pixel array 32. Row control signals output from row driver circuit 41' feeding timing row 72-S may be delayed with respect to the row control signals output from row driver circuit 41 feeding active row 70 by a delay amount provided by a second delay circuit 74 disposed somewhere along the right edge of pixel array 32 in the orientation of FIG. 6. The amount of delay provided by second delay circuit 74 may be equal to the column path settling time for a signal to settle on a column path 38.

For a given pixel that is being read out from active row 70 in column j, the pixel value PIXcolj will be read out via a corresponding column line 38. Pixel value PIXcolj can be sampled at a corresponding sample and hold (S/H) circuit 82 within asynchronous sampling circuitry 80. Sample and hold circuit 82 is sometimes referred to as a sampling circuit. Asynchronous sampling circuitry 80 may include as many sampling circuits 82 as the total number of columns within pixel array 32 or may include fewer sampling circuits 82 than the total number of columns within pixel array 32 (i.e., quantized sampling, described below).

Sample and hold circuit 82 may be triggered using a sampling signal RDcolj output from a logic gate such as logic OR gate 84. Sampling signal RDcolj is therefore sometimes referred to as a sampling circuit trigger signal. Logic OR gate 84 may have a first input coupled to a pixel in timing row 72-R in column j and may have a second input coupled to a pixel in timing row 72-S in column j. Configured in this way, the sampling of any given column j in the pixel array can be asynchronously triggered based on the column path settling time provided by delay circuit 74 and the row propagation delay for the row control signal output by row driver circuit 41' to propagate down one of the timing rows to column j. This sampling scheme is exemplary. If desired, the asynchronous sampling may optionally be retimed by a retiming clock.

In the example of FIG. 6, each pixel column in array 32 can be routed to a corresponding sampling circuit 82 to uniquely sample output values for that column. This is illustrative. In other embodiments, the sampling signal RDcol from one column can be used to asynchronously sample signals from two or more columns (e.g., to sample groups of columns). This technique is sometimes referred to as quantized sampling. For example, in the case of two-column quantized sampling, then a sampling signal RDcol2 from column 2 can be used for triggering the sampling of pixel values PIXcol1 and PIXcol2 output from columns 1 and 2, whereas RDcol4 from column 4 can be used for triggering the sampling of pixel values PIXcol3 and PIXL-col4 output from columns 3 and 4, and so on. As another example, in the case of three-column quantized sampling, then a sampling signal RDcol3 from column 3 can be used for triggering the sampling of pixel values PIXcol1, PIX-col2, PIXcol3 output from columns 1-3, whereas RDcol6 from column 6 can be used for triggering the sampling of pixel values PIXcol4, PIXcol5, and PIXcol6 output from columns 4-6, and so on. In other words, wherein each sampling circuit 82 can have an input that is coupled to multiple columns of pixels in the array.

The example of FIG. 6 in which the asynchronous sampling employs two separate timing/reference rows 72-R and 72-S is illustrative. In other embodiments, a single timing row can be used to generate the reset and signal asynchronous sampling/trigger signal RDcolj. The single timing row can be implemented as two or more parallel clocked rows with outputs averaged to remove unwanted element-by-element random variation. The example of FIG. 6 in which pixel array 32 is driven using row driver circuits from both sides of the array is also illustrative. If desired, the techniques described herein can also be applied to image sensor architectures having row driver circuits 41 disposed on only one side of the array, as shown in the example of FIG. 2.

Figure 7:
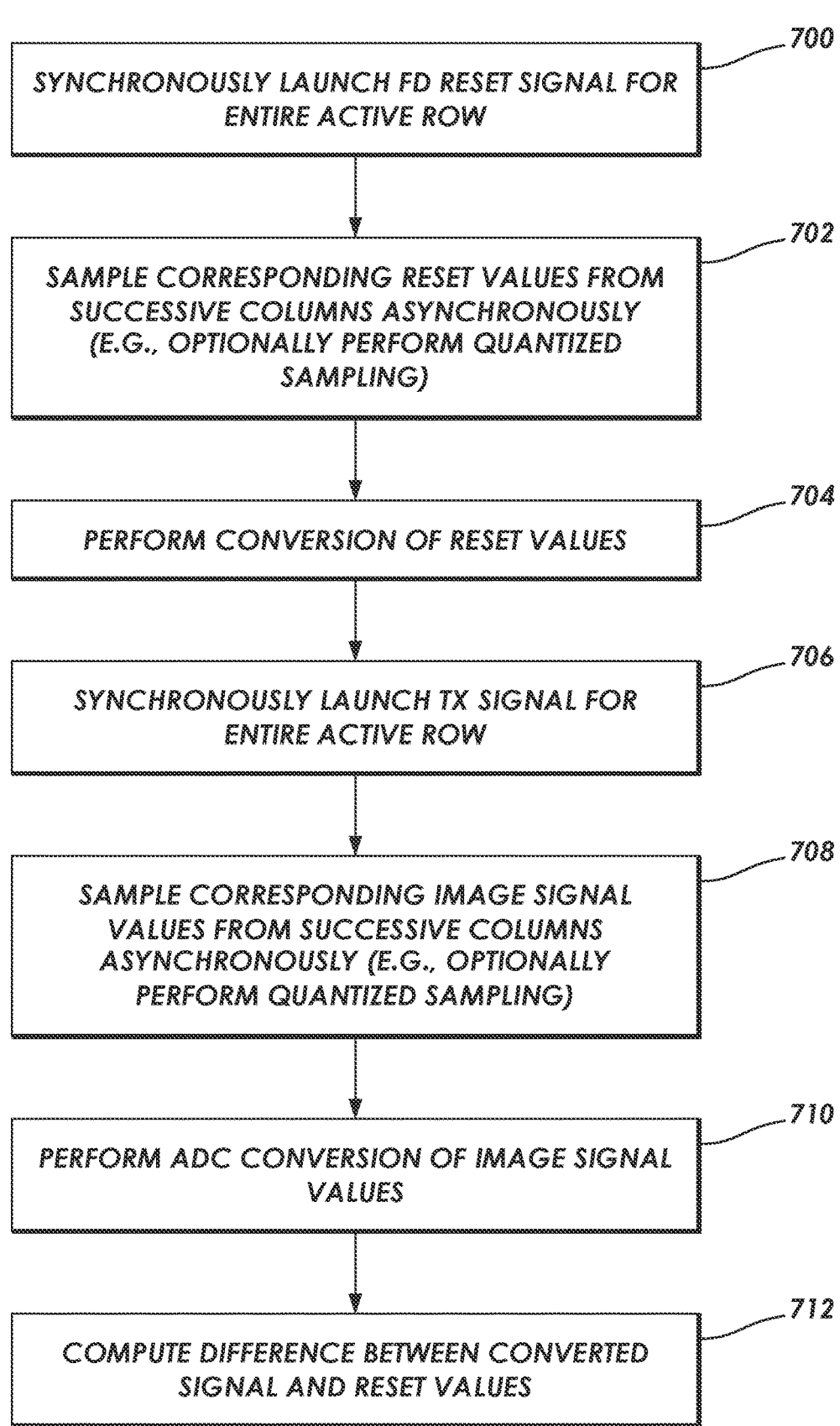
FIG. 7 is a flow chart of illustrative steps for operating image sensor circuitry of the type shown in FIGS. 1-6 in accordance with some embodiments.

FIG. 7 is a flow chart of illustrative steps for operating image sensor circuitry of the type described in connection with FIGS. 1-6. During the operations of block 700, a floating diffusion reset (FDR) signal is synchronously launched for an entire active row. This corresponds to the operation at time to in FIG. 5. Following this synchronous launch, the FDR control signal will propagate down the active row of pixels, arriving at the closest column first and then arriving at each successive column along that row at progressively later times until finally arriving at the furthest column. After the FDR signal arrives at a pixel in a particular column, that pixel is reset to a reset voltage, and a corresponding reset value can be output onto the associated pixel output column line. The reset value will settle on the pixel output column line after a column path settling time.

During the operations of block 702, the reset values output from the successive pixel columns can be asynchronously sampled using asynchronous sampling circuitry 80 (see, e.g., FIG. 6). In the example of FIG. 5, the reset value from the closest column can be sampled at time t2, whereas the reset value from the furthest column can be sampled at time t3. The reset values from the intermediate pixel columns between the closest column and the furthest column can be sampled sometime between t2 and t3. If desired, groups of pixel columns can be simultaneously sampled to achieve quantized sampling.

During the operations of block 704, the sampled reset values can be converted to corresponding digital codes. Each of the sampled reset values may be converted using respective analog-to-digital converters (ADCs) that can be coupled to the outputs of sample and hold circuits 82 in FIG. 6 and that can be included within readout circuitry 42 in FIG. 2. The ADC conversion for each pixel column can occur asynchronously at different times, following the asynchronous sampling of each reset value.

During the operations of block 706, a charge transfer (TX) signal is synchronously launched for the entire active row. This corresponds to the operation at time t2 in FIG. 5. The synchronous launch of the TX signal may occur before the rest value of the furthest column has settled on the pixel output column line. Following this synchronous launch, the TX control signal will propagate down the active row of pixels, arriving at the closest column first and then arriving at each successive column along that row at progressively later times until finally arriving at the furthest column. After the TX signal arrives at a pixel in a particular column, the accumulated charge is transferred to the floating diffusion region in that pixel, and a corresponding image signal value can be output onto the associated pixel output column line. The signal value will settle on the pixel output column line after a column path settling time.

During the operations of block 708, the signal values output from the successive pixel columns can be asynchronously sampled using asynchronous sampling circuitry 80 (see, e.g., FIG. 6). In the example of FIG. 5, the signal value from the closest column can be sampled at time t5, whereas the reset value from the furthest column can be sampled at time t6. The signal values from the intermediate pixel columns between the closest column and the furthest column can be sampled sometime between t5 and t6. If desired, groups of pixel columns can be simultaneously sampled to achieve quantized sampling.

During the operations of block 710, the sampled signal values can be converted to corresponding digital codes. Each of the sampled signal values may be converted using respective analog-to-digital converters (ADCs) that can be coupled to the outputs of sample and hold circuits 82 in FIG. 6 and that can be included within readout circuitry 42 in FIG. 2. The ADC conversion for each pixel column can occur asynchronously at different times, following the asynchronous sampling of each signal value.

During the operations of block 712, components in control circuitry 42 or 44 in FIG. 2 or in image processing and data formatting circuitry 16 in FIG. 1 can be used to compute differences between the converted reset values (digital reset codes) obtained from block 704 and the converted signal values (digital signal codes) obtained from block 710 to perform correlated double sampling (CDS). Performing correlated double sampling in this way can be technically advantageous to remove or reduce unwanted noise sources that can potentially corrupt the accuracy of the measured signal.

The use of the correlated double sampling readout scheme is merely illustrative. If desired, other types of image sensor readout schemes can optionally be employed. As an example, a single sampling scheme where only one signal sample is taken from each pixel without any preceding reset operation can be employed. As another example, a multi-sampling scheme where multiple signal samples are taken in succession and then averaged can be employed to reduce the effect of random noise, which can help improve the signal-to-noise ratio. As yet another example, a correlated multi-sampling (CMS) scheme that combines CDS with multiple signal samples taken in succession after the reset operation can be employed.

The foregoing is merely illustrative and various modifications can be made to the described embodiments. The foregoing embodiments may be implemented individually or in any combination.

What is claimed is:

1. A method of operating an image sensor having a pixel array, the method comprising:
    with a row driver circuit, outputting a row control signal to a row of pixels in the pixel array at a first time;
    with a first sampling circuit, sampling a first output signal from a first pixel in the row of pixels at a second time, wherein the first output signal settles on a first column line within a first column path settling time and is sampled at the second time after the first output signal has settled on the first column line; and
    with a second sampling circuit, sampling a second output signal from a second pixel in the row of pixels at a third time after the second time.

2. The method of claim 1, further comprising:
    receiving the row control signal at the first pixel in the row of pixels a first row propagation delay after the first time; and
    receiving the row control signal at the second pixel in the row of pixels a second row propagation delay after the first time, wherein a difference between the third time and the second time is equal to a difference between the second row propagation delay and the first row propagation delay.

3. The method of claim 1, wherein the second output signal from the second pixel in the row of pixels settles on a second column line within a second column path settling time, the method further comprising:
    with the row driver circuit, outputting an additional row control signal to the row of pixels in the pixel array before the second output signal has settled on the second column line.

4. The method of claim 3, wherein:
    outputting the row control signal comprises outputting a reset control signal to the row of pixels in the pixel array; and
    outputting the additional row control signal comprises outputting a charge transfer signal to the row of pixels in the pixel array.

5. The method of claim 4, further comprising:
    after sampling of the first output signal, converting to the first output signal to a first digital code; and
    after sampling the second output signal, converting the second output signal to a second digital code.

6. The method of claim 1, further comprising:
    with the first sampling circuit, sampling one or more additional output signals from one or more additional pixels in the row of pixels at the second time.

7. The method of claim 1, further comprising:

with a timing row of pixels having identical structure as the row of pixels, outputting a trigger signal to the first sampling circuit.

8. An image sensor comprising:

an array of pixels;

a plurality of row driver circuits configured to output row control signals to corresponding rows of pixels in the array;

a reference row of pixels;

asynchronous sampling circuitry having a plurality of sampling circuits, wherein each sampling circuit in the plurality of sampling circuits comprises a first input coupled to a column of pixels in the array and a second input coupled to the reference row of pixels;

an additional row driver circuit configured to output row control signals to the reference row of pixels; and a delay circuit coupled between the plurality of row driver circuits and the additional row driver circuit.

9. The image sensor of claim 8, wherein the delay circuit is configured to provide a delay amount equal to a column path settling time, and wherein a signal output from a given pixel in the array settles on a column line coupled to the given pixel within the column path settling time.

10. The image sensor of claim 8, further comprising:

an additional reference row of pixels disposed adjacent to the reference row of pixels.

11. The image sensor of claim 10, further comprising:

a logic gate having a first input coupled to a first pixel in the reference row of pixels, a second input coupled to a second pixel in the additional reference row of pixels, and an output coupled to one of the plurality of sampling circuits.

12. The image sensor of claim 11, wherein the logic gate comprises a logic OR gate.

13. The image sensor of claim 8, further comprising:

an additional plurality of row driver circuits configured to output row control signals to corresponding rows of pixels in the array, wherein the plurality of row driver circuits are disposed along a first edge of the array, and wherein the additional plurality of row driver circuits are disposed along a second edge of the array;

the additional row driver circuit is disposed along the first edge of the array;

a second additional row driver circuit disposed along the second edge of the array and configured to output row control signals to the reference row of pixels; and a second delay circuit coupled between the additional plurality of row driver circuits and the second additional row driver circuit.

14. The image sensor of claim 8, wherein the first input of each sampling circuit in the plurality of sampling circuits is coupled to multiple columns of pixels in the array.

15. An image sensor comprising:

an array of pixels;

a first row driver circuit configured to output row control signals to a row of pixels in the array;

a timing row of pixels disposed along an edge of the array of pixels;

a second row driver circuit configured to output row control signals to the timing row of pixels; and a delay circuit coupled between the first row driver circuit and the second row driver circuit.

16. The image sensor of claim 15, further comprising:

an additional timing row of pixels disposed adjacent to the timing row of pixels, wherein the timing row of pixels is configured to generate a trigger signal for sampling reset values from the array of pixels, and wherein the additional timing row of pixels is configured to generate a trigger signal for sampling signal values from the array of pixels.

17. The image sensor of claim 16, further comprising:

asynchronous sampling circuitry having a plurality of sampling circuits, wherein each sampling circuit in the plurality of sampling circuits has a first input coupled to a respective column of pixels in the array and has a second input configured to receive a first signal from a first pixel in the timing row of pixels or to receive a second signal from a second pixel in the additional timing row of pixels.

18. The image sensor of claim 17, wherein the first input of each sampling circuit in the plurality of sampling circuits is coupled to multiple columns of pixels in the array.

* * * * *